INVENTOR.
WILLIAM A. WARE
By White & Haefliger
ATTORNEYS.

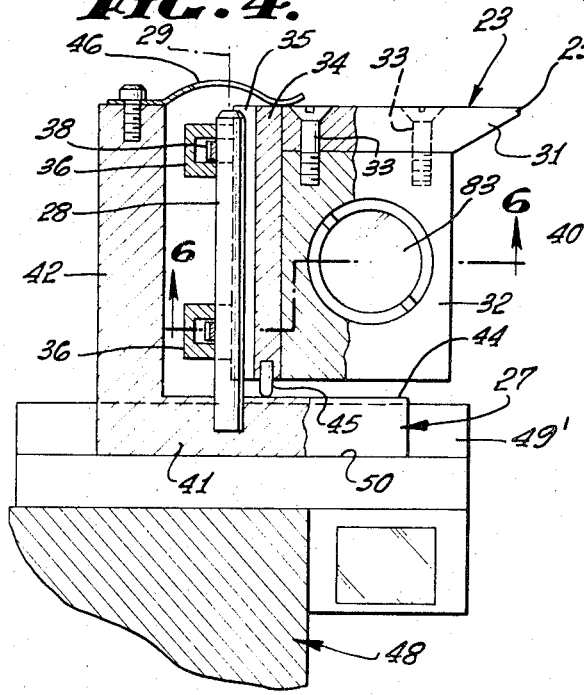

United States Patent Office 3,554,651
Patented Jan. 12, 1971

3,554,651
SCREW CALIBRATION METHOD AND APPARATUS
William A. Ware, Crestline, Calif., assignor, by mesne assignments, to Rusco Industries, Inc., Los Angeles, Calif., a corporation of Delaware
Filed Oct. 18, 1967, Ser. No. 676,309
Int. Cl. G01b 11/24, 11/26
U.S. Cl. 358—138                 14 Claims

ABSTRACT OF THE DISCLOSURE

A screw is calibrated by sensing the location along the screw of a first selected screw portion in relation to a first point offset from the screw for establishing a first corresponding optical axis; sensing the location along the screw of a second selected screw portion in relation to a second point offset from the screw and establishing a second corresponding optical axis; the offset points being spaced along the screw; and deriving an indication of the relative angularity of those axes.

BACKGROUND OF THE INVENTION

This invention relates generally to calibration, and more specifically concerns method and apparatus for effecting highly accurate calibration of precision screws such as elongated lead screws.

Precision screws have many applications, as for example in cutting tools for optical forming equipment, precision controls, and the like. Typically, a follower is movable along such a screw as the latter rotates, the screw desirably positioning the follower with great accuracy; for example, if the screw has twenty turns per inch length, twenty revolutions displaces the follower one inch. If the screw thread does not define exactly twenty turns per inch length, it is clear that the follower will not be displaced precisely one inch in response to twenty revolutions of the screw; however, if the thread has been previously calibrated in terms of correspondence between screw revolution and dimensions of thread points (from a selected base point), it can be seen that a known correction can be made for each position of the follower. For example, to displace the follower one inch, it might be necessary to rotate the screw through an angle of 20 times 360°, plus 5° (the correction factor determined by calibration). While devices and methods have been devised to calibrate screws, none to my knowledge have provided the unusually advantageous features of construction, mode of operation and results afforded by the present invention.

SUMMARY OF THE INVENTION

It is a major object of the invention to provide means and apparatus whereby a precision screw may be calibrated with rapidity, extreme accuracy and inexpensively. Basically, the method of the invention is embodied in steps that include sensing the location along the screw of a first selected screw portion in relation to a first point offset from the screw for establishing a first corresponding optical axis; sensing the location along the screw of a second selected screw portion in relation to a second point offset from the screw and establishing a second corresponding optical axis, the offset points being spaced along the screw; and deriving an indication of the degree of relative angularity of the two established axes. Typically, the sensing steps include relatively traveling a sensor into contact with grooving defined by the screw thread and into engagement with thread shoulders, and allowing the sensor to pivot about parallel axes passing through the offset points. Further, the method includes displacing the sensor along the screw a distance determined by the spacing of the offset points and which corresponds to a selected number of screw thread turns. As will be seen, the optical axes may be established by controlling the direction of a beam of radiation in response to pivoting of the sensor, the controlling step typically including variably reflecting the beam in correspondence to pivoting of the sensor.

In its apparatus aspects, the invention is typically embodied in a combination that includes the sensor adapted to engage the screw thread; means mounting the sensor for relative travel toward and into engagement with the screw thread at selected locations therealong and for pivoting of the sensor in response to such engagement; and means to establish optical axes corresponding to pivoted positions of the sensor. The latter means may include a mirror pivotable with the sensor and a light beam source directed at the mirror. Typically, instrumentation is provided in the paths of the optical axes to determine their angularity, such instrumentation comprising for example a scale for receiving impingement of the return light beam reflected by the mirror.

The mounting means referred to above typically may comprise a first carriage to travel the sensor toward and away from the screw, and a pivot on the first carriage pivotally mounting the sensor to rotate about a second axis generally normal to the screw axis. The mounting means may also include a base, and a second carriage slidable along the base in a direction parallel to the screw lengthwise dimension, the second carriage mounting the first carriage. Alternatively, the second carriage may be advanced by a master screw in a direction parallel to the first or calibration screw, as will be seen.

These and other objects and advantages of the invention, as well as the details of an illustrative embodiment, will be more fully understood from the following detailed description of the drawings.

BRIEF DESCRIPTION OF THE DRAWINGS

FIG. 4 is an enlarged fragmentary vertical section, partly broken away, and showing details of sensor pivotal mounting;

FIG. 5 is a top plan view of the apparatus as seen in FIG. 4;

FIG. 6 is a horizontal section taken on line 6—6 of FIG. 4;

FIGS. 7 and 8 illustrate engagement of the sensor with a screw thread;

FIG. 9 illustrates a typical field of view over the autocollimator scale;

FIG. 10 is a top plan view similar to FIG. 1, but showing modified apparatus;

FIG. 11 is a top plan view similar to FIG. 1, and showing further modified apparatus;

FIG. 12 is a graph illustrating screw calibration; and

FIG. 13 is a geometric diagram illustrating geometric principles of the invention.

DESCRIPTION OF THE PREFERRED EMBODIMENTS

Figure 1:
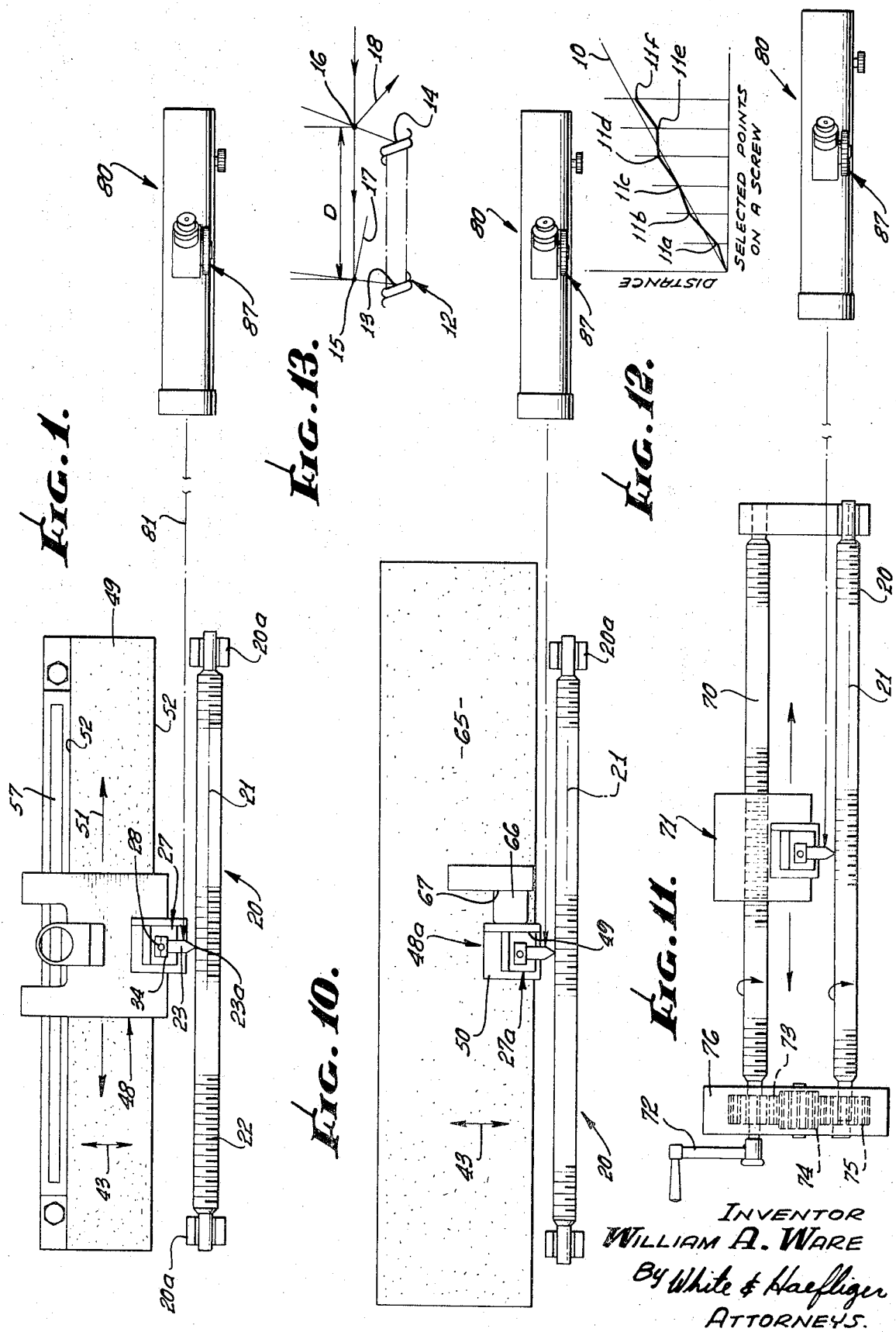
FIG. 1 is a top plan view of one preferred form of the apparatus.

Referring first to FIG. 12, a graph of distance versus selected points on a screw is illustrated. Generally, a screw is designed to have a certain number of turns T per inch of screw length, as for example 20 turns per inch. Due to circumstances of manufacture, the screw might have slightly less than 20 turns per inch, or expressed otherwise, 20 turns might represent slightly more than one inch of screw length. Thus, in FIG. 12 the abscissa or selected points on the screw might represent inches to very accurate dimensions, and the ordinate or "distance" might represent screw turns. A perfect screw would be represented by the straight line 10 with precise and equal numbers of turns per inch of screw length, whereas an imperfect screw might be represented by the points 11a–11f defining unequal screw turn intervals corresponding to equal increments of length along the screw. It becomes important in certain applications to obtain an accurate calibration of a screw in terms of turns per inch, or inches per turn, so that the position of a follower that travels along the screw may become known with great accuracy.

Referring now to FIG. 13, the principle of the invention is geometrically illustrated for purposes of explaining the method of screw calibration. The screw 12 is seen to have turns defining a first selected screw portion or shoulder 13 and a second selected portion or shoulder 14, these being axially spaced. Portion 13 is related to a first point 15 offset from the screw and portion 14 is related to a second point 16 offset from the screw. In accordance with the method, the location of portion 13 is sensed in relation to point 15 for establishing a first corresponding optical axis, as for example is seen at 17; and likewise, the location of portion 14 is sensed in relation to point 16 and a second corresponding optical axis 18 is established. In this regard, the points 15 and 16 may typically be axially spaced along the screw a known distance corresponding to a selected number of turns, so that for example if there should be exactly twenty turns per inch the distance D between points 15 and 16 may be precisely one inch.

Finally, the method calls for deriving an indication of the degree of angularity between the established optical axes 17 and 18, that angularity then giving an indication of a corresponding incremental length along the screw which may be added to or subtracted from one inch for determining the actual turns per inch (or inches per turn). In a typical example, if the angular difference between axes 17 and 18 is one second of arc, the corresponding indicated increment of length along the screw may be .000010 inch; however, these values are illustrative only and are not intended to limit the invention.

Referring now to FIGS. 1–5, the screw 20 to be calibrated is end mounted at 20a and defines an axis 21 about which the thread 22 extends, helically. A sensor adapted to engage the thread is indicated at 23 as having a tip 23a which is tapered to penetrate the thread in the manner seen in FIG. 7. Thus, the tapered faces 23b of the sensor are engageable with the thread at locations 24. Alternatively, the sensor may have a ball tip as seen at 25 in FIG. 8, for tangential engagement with the thread at locations 26, the ball size accommodating penetration into threads of different pitch distance.

In accordance with a further aspect of the invention, mounting means is provided to mount the sensor 23 for relative travel toward and into engagement with the screw thread at selected locations therealong, and for pivoting of the sensor in response to such engagement. As will be seen, the mounting means typically comprises a first carriage, as for example is illustrated at 27, to travel the sensor toward and away from the screw, and a pivot, as for example is illustrated by rod 28, on the first carriage pivotally mounting the sensor to rotate about a second axis 29 generally normal to the screw axis. Typically, axis 29 extends vertically in offset relation to horizontal screw axis 21, to define that "normal" relationship.

A highly advantageous form of sensor construction is depicted in FIGS. 4–6 as including upper and lower body parts 31 and 32, the former having the tip 23a, such parts being made integral by fastener interconnection at 33. Such parts are also integral with a vertical body flange 34 having a V-cut groove 35 extending vertically to receive the pivot rod 28. The walls of the groove are resiliently urged or clamped into tangential engagement with the rod by structure which may typically include the vertically spaced brackets 36 attached at 37 to the flange 34, and the bowed springs 38. The latter are received in bracket grooves 39 and engage the rod and brackets to urge the latter in the direction of arrow 40 in FIG. 6. Post or rod 28 is carried by the horizontally extending leg 41 of carriage 27, the latter also having a vertical leg 42 which may be grasped for advancing the carriage toward and retracting the carriage away from the screw 20, and in a direction indicated by arrows 43 in FIG. 5. That direction is generally normal to axes 29 and 21.

Precision swiveling of the sensor about axis 29 and without up or down displacement is typically obtained by providing a precisely flat horizontal upper surface 44 on leg 41; a foot 45 carried by the sensor to slidably engage that surface; and a bowed spring 46 urging the sensor downwardly to maintain the foot in engagement with surface 44. Spring 46 is typically supported at the top of leg 42, as shown.

Movement of carriage 27 in direction 43 is guided by a way or ways 49' and 50 on a second carriage 48. Way 49' defines a vertical plane parallel to direction 43 and is slidably engaged by edge 51 of the first carriage; and way 50 defines a horizontal plane parallel to direction 43 and slidably supports the flat underside of the carriage 27.

Figure 2:
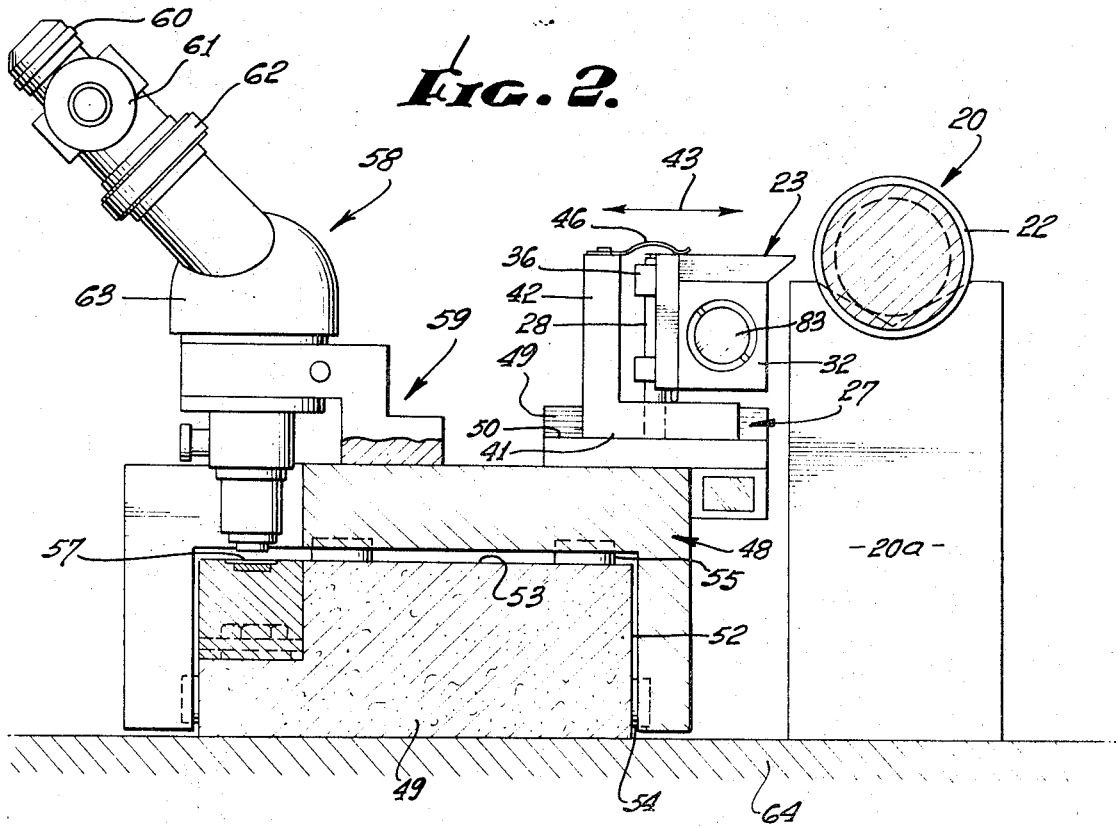
FIG. 2 is an enlarged vertical section taken through the FIG. 1 apparatus.
Figure 3:
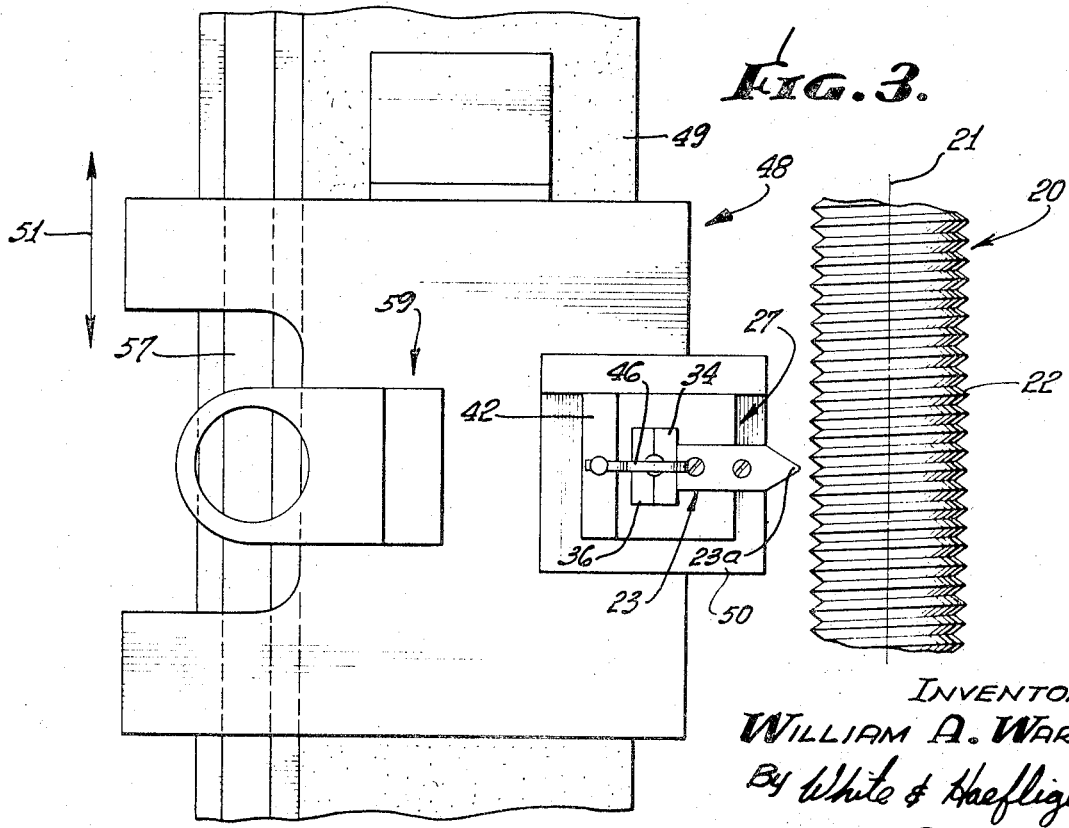
FIG. 3 is a top plan view of the apparatus as seen in FIG. 2.

As better seen in FIGS. 2 and 3, the second carriage 48 and a base 49 mount the first carriage 27, as by the above described ways, and the second carriage is slidable along the base in a direction 51 parallel to the screw axis 21. Typically, the base 49 may comprise a granite block having guide surfaces 52 extending in vertical planes parallel to direction 51 and a guide surface 53 extending in a horizontal plane parallel to directions 51 and 43. Slippers 54 and 55 carried by the second carriage 48 engage surfaces 52 and 53, for precision guiding of the carriage along the base.

The carriage and base also mount means for determining the displacement of the carriage along the base. Such means may take the form of a precisely graduated scale 57 on the base and optical apparatus 58 mounted on the carriage at 59 for viewing graduations on that scale. Such apparatus may typically include a Bausch & Lomb filar micrometer eyepiece 60, with adjustment at 61; a focusing ring 62; and a Bausch & Lomb Macroscope 63. Note also the table 64 mounting the base and screw support 20a.

FIG. 10 illustrates another mounting means for the first carriage, as comprising an elongated base 65 similar to base 49 and a second carriage 48a. Gauge block means is also located on that base to precisely locate the second carriage at determinable positions lengthwise of the base. One such gauge block is shown at 66 between the second carriage 48a and a fixed locating shoulder 67. Multiple gauge blocks may be stacked in end to end series to locate the first carriage 27a at preselected positions along the screw 20 to be calibrated. Carriage 48a defines ways 49 and 50, as before, and the carriage 48a has a precision shoulder abutting the gauge block 66 and extending in a vertical plane parallel to direction 43 described above.

In FIG. 11 the mounting means includes a master screw 70, and a second carriage 71 movable along the master screw in response to rotation of the latter, such movement being parallel to the axis 21 of the first screw 20. Carriage 71 has a threaded bore receiving the master screw and meshing therewith so as to follow along it as the master screw is rotated, as by crank 72. Means is also provided to rotate the test screw 20 in synchronism with the master screw, and typically may comprise drive gear 73 rotated by crank 72, idler gear 74 and driven gear 75 that rotates with screw 20. A housing for receiving and supporting the various gears is indicated at 76. With the master screw having precisely known turns per inch, or dimensions, obtained through prior calibration, and with the test screw having nominally the same number of turns per inch as the master screw, and with both screws rotated in synchronism, i.e., at the same rate, the test screw may be rapidly checked or calibrated without need of a scale 57 as in FIG. 1, or gauge blocks as in FIG. 10, as will appear.

Further, in accordance with the invention, means is provided to establish optical axes (as for example axes such as 17 and 18 in FIG. 13) corresponding to pivoted positions of the sensor at selected locations along the screw. Such means typically includes a light source indicated at 80 in FIG. 1, and projecting a narrow light beam 81 toward the sensor 23 and parallel to axis 21. The axis establishing means also includes a mirror 82 pivotable with the sensor, the mirror typically being carried by the sensor body part 32 and protectively covered by a transparent plate 83 providing a target for the light beam. Light is reflected from the mirror typically at angles corresponding to pivoting of the sensor, thereby to establish optical axes such as were discussed above at 17 and 18.

Instrumentation is also provided in the paths of the optical axes (defined by the reflected light beams) for measurement of angular displacement of those axes, as for example with respect to a reference axis or with respect to each other. Such instrumentation typically comprises an autocollimator indicated at 87 and having a scale (seen at 88 in FIG. 9) for receiving impingement of the return light beams reflected from the mirror in different positions of the sensor along the screw. The autocollimator measures the angularity of the reflected beams with respect to a reference axis such as beam axis 81, and scale 88 may be calibrated so that if the reflected beam in one position of the sensor strikes the scale at .210 and in another position of the sensor strikes the scale at .220, it is known that the sensor has pivoted by an angular amount corresponding to a distance along the lead screw of .010 unit measure, such units being inches, or tenths or hundredths of an inch. Accordingly, if the screw should have 20 turns per inch, and if the sensor was moved along the screw exactly one inch between the positions at which the measurements were taken, it is known that the screw has 20 turns per 1.000—.010 inch, or 20 turns per 1.000+.010 inch, depending upon the direction of sensor pivoting, and also assuming that the unit of scale measure is inches.

In operation, the sensor is moved along the screw to test locations of known increments of separation, and the sensor is advanced into the thread at each test location to establish an optical axis. That axis is related to the pivot point defined by pivot axis 29 and to the selected screw portion engaged by the sensor tip, since the mirror is pivoted to an extent determined by the location of the pivot axis 29 in relation to the location of the sensor tip. The known increment of separation may for example be determined by the distance between the pivot axes 29 at the selected sensor locations, and may correspond to a selected number of screw turns, as described.

I claim:

1. The method of calibrating a screw having a longitudinal axis, that includes:
sensing the location along the screw of a first selected screw portion in relation to a first point offset laterally from the screw for establishing a first corresponding optical axis,
sensing the location along the screw of a second selected screw portion in relation to a second point offset laterally from the screw for establishing a second corresponding optical axis,
said offset points being spaced apart a known distance along an axis substantially parallel to the longitudinal axis of the screw, and said establishment of said optical axis being carried out by reflecting at said points, a beam of radiation transmitted lengthwise of the screw along said axis substantially parallel to the longitudinal axis of the screw,
and deriving an indication of the relative angularity of said optical axes.

2. The method of claim 1 wherein said sensing steps include relatively traveling a sensor into contact with grooving defined by the screw thread and into engagement with thread shoulders, and allowing said sensor to pivot about parallel axes passing through said points, said parallel axes being normal to the longitudinal screw axis.

3. The method of claim 2 including relatively displacing said sensor along the screw the known distance between said offset points which corresponds to a selected number of screw thread turns.

4. The method of claim 2 wherein said optical axes are at least in part established by controlling reflection of said beam of radiation in response to pivoting of said sensor.

5. For use in calibrating a screw having an axis and a thread extending thereabout, the combination comprising:
a sensor to engage the screw thread,
mounting means mounting the sensor for relative travel a precisely measurable distance parallel to said axis and also toward and into engagement with the screw thread at selected locations therealong whose separation is precisely known and for pivoting of the sensor in response to said engagement,
and means to establish optical axes corresponding to pivoted positions of the sensor, said last named means including a radiation source located to transmit a beam of radiation parallel to the screw axis, and a reflector to variably reflect the beam in correspondence to pivoting of the sensor.

6. The combination of claim 5 including instrumentation in the path of said optical axes for measurement of angular displacement of said optical axes.

7. The combination of claim 5 wherein said mounting means comprises a first carriage to travel the sensor toward and away from the screw, and a pivot on the first carriage pivotally mounting the sensor to rotate about a second axis generally normal to the screw axis.

8. The combination of claim 7 wherein said mounting means includes a base, and a second carriage slidable along the base in a direction parallel to the screw axis, said second carriage mounting said first carriage for said travel.

9. The combination of claim 7 wherein said mounting means includes a master screw, and a second carriage movable along the master screw in response to rotation thereof and in a direction parallel to the first screw axis, the second carriage mounting said first carriage.

10. The combination of claim 5 wherein said reflector is mounted to pivot with said sensor.

11. The combination of claim 10 wherein said instrumentation includes an autocollimator having a scale for receiving impingement of the return light beam reflected by the mirror.

12. The combination of claim 7 wherein said mounting means includes an elongated base, and including gauge block means on the base for locating the second carriage at a selected position along the base and from which the first carriage travels toward and away from the screw.

13. The combination of claim 8 including apparatus on the base and second carriage to precisely locate the first carriage at determinable positions therealong.

14. The combination of claim 9 including means to rotate the screw to be calibrated and in synchronism with rotation of the master screw.

(References on following page)

References Cited

UNITED STATES PATENTS

| | | | |
|---|---|---|---|
| 653,881 | 7/1900 | Pollak | 350—285 |
| 1,297,194 | 3/1919 | Lindgren | 33—199(B) |
| 1,303,198 | 5/1919 | Harris | 33—199(B) |
| 1,528,314 | 3/1925 | Wickman | 33—199(B) |
| 1,894,111 | 1/1933 | Marcellus | 350—285 |
| 2,159,335 | 5/1939 | Markwick | 33—199X |
| 2,431,013 | 11/1947 | Aller | 33—199 |
| 2,794,262 | 6/1957 | Birrell et al. | 33—199(B) |
| 2,806,293 | 9/1957 | James et al. | 33—199(B) |
| 2,829,442 | 4/1958 | Peickii | 33—199(B) |
| 3,066,421 | 12/1962 | Choate et al. | 356—168 |

FOREIGN PATENTS

| | | | |
|---|---|---|---|
| 597,433 | 1948 | Great Britain | 33—199 |
| 584,894 | 1933 | Germany | 356—153 |
| 489,593 | 1938 | Great Britain | 356—156 |

RONALD L. WIBERT, Primary Examiner

J. ROTHENBERG, Assistant Examiner

U.S. Cl. X.R.

33—199; 356—150, 153